March 2, 1926.  1,575,374

J. MARGOLIS ET AL

POULTRY COOP

Filed Jan. 8, 1925   2 Sheets-Sheet 1

INVENTORS
J. Margolis
M. Votinetz
BY
T. F. Bourne
ATTORNEY

March 2, 1926.
J. MARGOLIS ET AL
1,575,374
POULTRY COOP
Filed Jan. 8, 1925
2 Sheets-Sheet 2
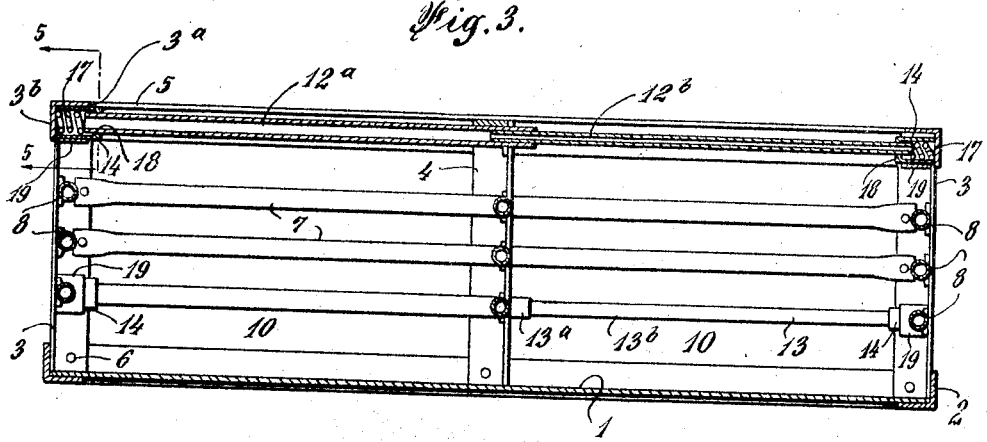
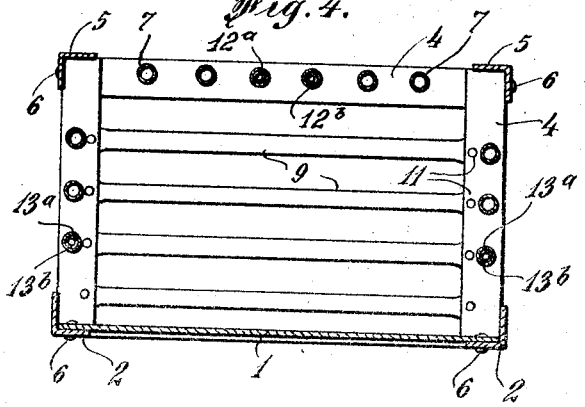
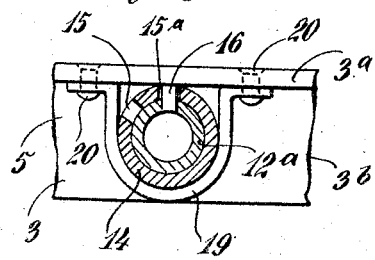
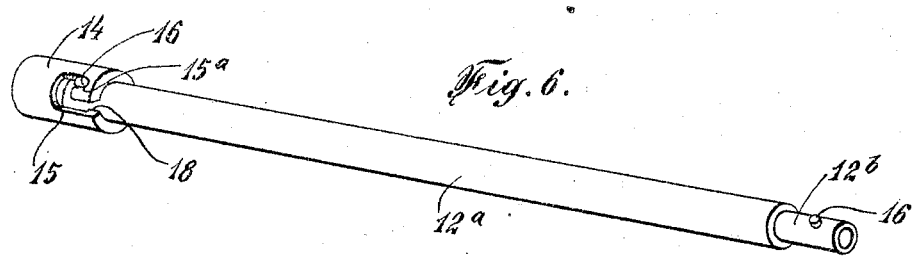
INVENTORS
J. Margolis
M. Volinetz
BY
ATTORNEY Patented Mar. 2, 1926.

1,575,374

UNITED STATES PATENT OFFICE.

JOSEPH MARGOLIS AND MAX VOLINETZ, OF NEW YORK, N. Y.

POULTRY COOP.

Application filed January 8, 1925. Serial No. 1,160.

*To all whom it may concern:*

Be it known that we, JOSEPH MARGOLIS and MAX VOLINETZ, citizens of the United States, and residents of New York city, county of Kings, State of New York, have invented certain new and useful Improvements in Poultry Coops, of which the following is a specification.

Heretofore it has been customary to ship live poultry in portable wooden coops or crates having slats nailed in place. To insert or remove the poultry it has been necessary to withdraw the nails holding several slats, move the slats to one side and replace the slats and nail them tight. Considerable time is consumed in releasing and nailing the slats, the nails are liable to protrude and injure the poultry, and the slats become broken, all of which entails considerable expense and the poultry do not thrive. Furthermore, the wooden coops are quite unsanitary since the manure remains in them and they are not well adapted to be washed because of their wooden characteristics and the nailing of the slats.

An object of our invention is to provide a substantially constructed coop having telescopically disposed bars with means to detachably retain such bars in operative position in such manner that any of such bars may be released and slid lengthwise within the dimensions of the coop to permit poultry to be inserted and removed. The bars will be smooth so as not to injure the poultry, and are not liable to become loose, detached or broken. An advantage of our invention is that the coop may be made of metal so that it may be thoroughly washed without injury and the coop has sanitary advantages.

Our invention also comprises novel details of improvement that will be more fully hereinafter set forth and then pointed out in the claims.

Reference is to be had to the accompanying drawings forming a part hereof, wherein—

Fig. 3 is a longitudinal section substantially on line 3, 3, in Fig. 1;

Fig. 4 is a cross section on line 4, 4, in Fig. 1;

Fig. 5 is an enlarged sectional detail on line 5, 5, in Fig. 3; and

Fig. 6 is a perspective view illustrative of one of the telescopic bars of the coop.

Similar numerals of reference indicate corresponding parts in the several views.

Figure 1:
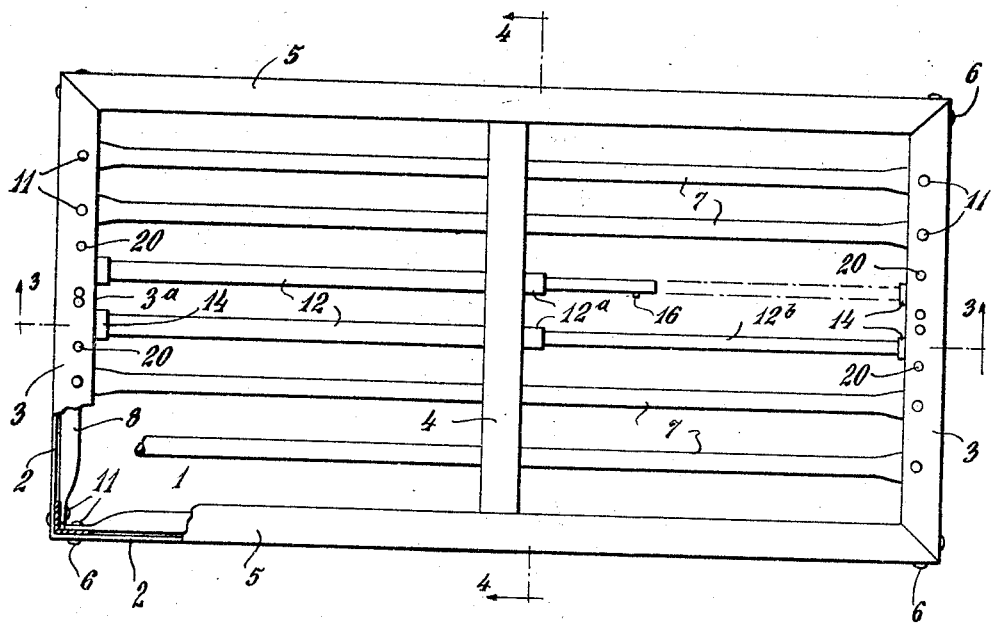
Fig. 1 is a partly broken plan view of our improved coop.
Figure 2:
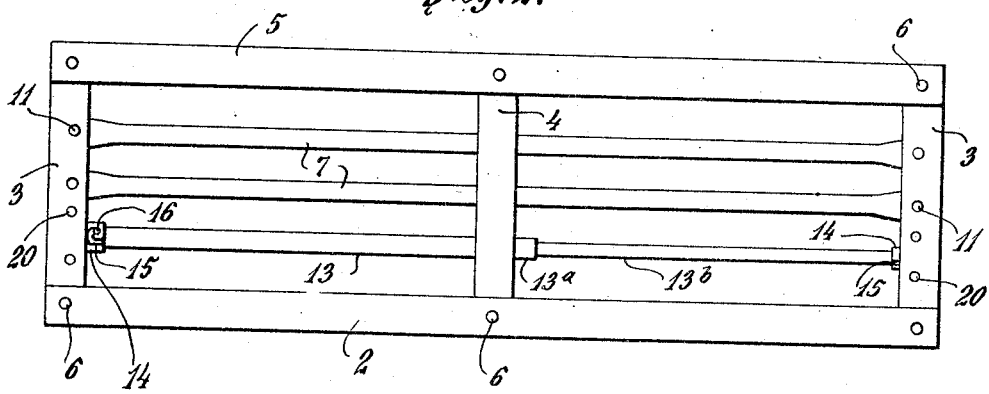
Fig. 2 is a side elevation.

The coop is shown in rectangular form having a bottom plate or board 1 secured to angular strips 2 enclosing the same all around at the bottom of the coop, and end strips 3, also preferably angular, secured to the strips 2, forming a rectangular framing, and intermediate strips 4, secured to the strips 2. Top strips 5 extend along the sides from the upper portions of the end strips 3, being secured thereto and to the strips 4. The strips may be connected together by rivets 6, or in any other desired way. Stationary bars 7 extend along the top and the sides of the coop and are secured to the end strips 4, stationary cross bars 8 extend across the ends of the coop, and stationary cross bars 9 extend between the strips 4, dividing the coop into two compartments 10, for the poultry, although the bars 9 may be omitted to provide a coop having a single compartment. The bars may be secured to the strips in any desired way, and may be made of metal tubes having their ends flattened to rest against the contiguous strips and may be secured thereto by rivets 11. One or more top bars 12 are telescopically disposed and bars 13 on one or both sides are telescopically arranged. The bars 12 each comprise an outer tube $12^a$ and an inner tube or rod $12^b$ slidable therein. The bars 13 are similarly arranged, comprising an outer tube $13^a$ and an inner tube or rod $13^b$. The inner ends of the tubes $12^a$, $13^a$ are slidably supported in holes in the strips 4.

The outer ends of the telescopic bars are detachably connected with the end strips 3. For such purpose we have illustrated a tubular retainer or bushing 14 adapted to slidably receive the adjacent end of the corresponding tubular bar, 12, $12^b$ and $13^a$, $13^b$. The retainers or bushings have bayonet slots 15 adapted to receive pins 16 adjacent to the outer ends of the tubular bars, (Fig. 6). Coil springs 17 within the retainers 14 abut the corresponding strips and bear against the inner ends of the corresponding tubular slidable bars, serving to retain the pins 16 in the inner reverse end portions 15$^a$ of the bayonet slots 15, (Figs. 3 and 6). At the outer ends of the bores of the retainers or bushings 14 abutment shoulders 18 for the springs 17 are provided to retain them when the tubular telescopic bars are removed from the retainers. The retainers or bushings 14 may be secured to the corresponding strips 13 by any desired means. We have shown strap or clip 19 embracing the retainer 14 and secured by rivets 20 to the top web 3$^a$ of strip 3, the said clip securing the retainer against said web with the outer end of the retainer and the spring 17 bearing against the side web 3$^b$ of said strip, (Fig. 5).

In accordance with our improvement, when the poultry is to be placed in or removed from the coop or crate, the tubular bar 12$^a$ or 12$^b$ is released from its retainer 14, by pushing the bar and rotating it to release its pin 16 from bayonet slot 15, and then such bar is slid lengthwise, being guided and supported by its companion bar. Thus, if bar 12$^a$ is operated it will slide on bar 12$^b$, and if bar 12$^b$ is operated it will side within bar 12$^a$, giving access to either compartment 10. The same operation pertains to the slidable bars 13$^a$, 13$^b$. Two telescopic bars are shown on the top of the coop to provide sufficient space, when the bars are slid longitudinally, for the passage of the poultry. One telescope bar is shown on each side of the coop to permit sufficient space for the poultry to be fed by means of feed troughs hung at the side or sides of the coop, in an ordinary way.

Our improved coop may be made of metal, so that it will be rigid and serviceable for transportation, and will be sanitary in that it may be readily washed and cleaned. Furthermore, there are no parts liable to become loosened, the bars may be round and smooth so as not to injure the poultry, and no nailing of slats is required. The cost of handling the poultry is reduced, since it is merely necessary to slide the telescopic bars back and forth, instead of removing nails and replacing them as has been necessary with wooden coops.

Having now described our invention what we claim is:

1. A coop of the character specified provided with enclosing means on all sides some of which are telescopically disposed bars slidable one within the other with their telescoping ends at the mid-portion of the coop when the said bars are extended to close the coop, the coop having a strip provided with an opening slidably supporting the outer of the telescopic bars with the companion bar slidably retained within the outer bar, and means to detachably retain the bars.

2. A coop as set forth in claim 1, in which either of the telescopic bars is slidable along the other bar within the dimensions of the coop.

3. A coop of the character specified comprising a bottom, strips, and bars carried by the strips enclosing all sides of the coop, some of the bars being telescopically arranged to slide along one another, with their telescoping ends at the mid-portion of the coop, either bar supporting the other when telescoped, an inner strip having an opening slidably receiving the outer telescopic bar, end strips of the coop supporting the outer ends of the telescopic bars when they are extended to close the coop, an outer and an inner strip wholly supporting and retaining both bars when they are telescoped, and means to detachably retain the last named bars.

4. A coop as set forth in claim 3, in which the means for detachably retaining the telescopic bars are carried by the strips at the outer ends of the bars.

5. A coop as set forth in claim 3, in which the inner ends of the telescopic bars are arranged adjacent to the mid-portion of the crate to slide within the dimensions of the crate, a portion of one bar being permanently within the other bar and supported thereby in all positions of said bars, the outer telescopic bar at its inner end extending beyond the inner strip to support the inner ends of both bars when they are extended to close the coop.

6. A coop as set forth in claim 1, having means for detachably retaining the telescopic bars comprising retainers provided with bayonet slots, said bars having pins cooperating with the slots, and means to resiliently retain the pins in the slots.

7. A coop of the character specified comprising a bottom, end strips, and longitudinal bars, some of said bars being telescopically arranged to slide one along another, retainers for said bars carried by the end strips, said retainers being provided with bores to receive the bars and having bayonet slots, said bars having pins to cooperate with said slots, and springs within the retainers operative against the corresponding bars to retain the pins in the slots.

8. A coop as set forth in claim 7, in which the retainers are provided with shoulders cooperative with the springs to keep the latter in the retainers when the bars are absent therefrom.

9. A coop comprising a bottom, end strips, and an intermediate strip, bars attached to the end strips along all sides of the coop other than the bottom, other bars between the first named bars being telescopically disposed and slidable through holes in the intermediate strip, the ends of said bars extending on opposite sides of the strip for a bar when its companion bar telescopes it, and means to retain the telescopic bars in extended position.

10. A coop as set forth in claim 9, in which the means to retain the telescopic bars comprise retainers attached to the end strips, interengaging means being provided between the bars and the corresponding retainers for keeping them detachably together.

Signed at New York, county of New York and State of New York, this 6th day of January, 1925.

JOSEPH MARGOLIS.
MAX VOLINETZ.